United States Patent
Lee et al.

(10) Patent No.: US 8,196,908 B2
(45) Date of Patent: Jun. 12, 2012

(54) COUNTER FLOW TYPE OF COOLING TOWER

(76) Inventors: Hoo-Kun Lee, Daejeon (KR); Kil-Nam Jang, Daejeon (KR); Yong-Beom Kim, Daejeon (KR)

(*) Notice: Subject to any disclaimer, the term of this patent is extended or adjusted under 35 U.S.C. 154(b) by 646 days.

(21) Appl. No.: 12/339,755

(22) Filed: Dec. 19, 2008

(65) Prior Publication Data
US 2009/0166902 A1  Jul. 2, 2009

(30) Foreign Application Priority Data
Dec. 27, 2007  (KR) .................. 10-2007-0138163

(51) Int. Cl.
*B01F 3/04*  (2006.01)
(52) U.S. Cl. ............ 261/133; 261/148; 261/112.1; 261/DIG. 11
(58) Field of Classification Search ............ 261/97, 261/110, 112.1, 117, 133, 148, 151, 153, 261/156, 157, 159, 161, DIG. 11
See application file for complete search history.

(56) References Cited

U.S. PATENT DOCUMENTS

| | | | | |
|---|---|---|---|---|
| 3,353,799 A * | 11/1967 | Lions et al. | ............ | 261/3 |
| 3,865,911 A * | 2/1975 | Lefevre | ............ | 261/140.1 |
| 3,923,935 A * | 12/1975 | Cates | ............ | 261/159 |
| 3,983,190 A * | 9/1976 | Norback | ............ | 261/111 |
| 4,318,772 A * | 3/1982 | Kragh | ............ | 210/712 |
| 4,361,524 A * | 11/1982 | Howlett | ............ | 261/150 |
| 5,028,356 A * | 7/1991 | Wiltz | ............ | 261/109 |
| 5,512,072 A * | 4/1996 | Laslo | ............ | 96/234 |
| 7,294,322 B2 * | 11/2007 | Johnson et al. | ............ | 423/243.01 |

* cited by examiner

*Primary Examiner* — Charles Bushey
(74) *Attorney, Agent, or Firm* — Rabin & Berdo, PC (57) ABSTRACT

This invention relates to a counter flow type of cooling tower generating low grade of noise, which includes: a body wherein an external air inhalation hole is formed in the lower portion and a discharge hole is formed in the upper portion; a fan that is provided in the body and absorbs external air into the body through an inhalation hole and discharges the external air to the discharge hole; an spraying nozzle that sprays coolant; an eliminator that is provided above the spraying nozzle and prevents air and water from scattering; a filler that is provided below the spraying nozzle; and a collection tank collecting the coolant that passes the filler and drops, wherein a space portion is formed between the filler and the collection tank, and the space portion formed between the filler and the collection tank further includes a noise generation restraining portion consisting of at least one noise generation restraining unit. According to the invention, the noise that occurs when the coolant directly drops into the collection tank is reduced, the scattering of the coolant by incoming air may be prevented, the loss of pressure by the noise generation restraining portion is minimized, the amount of lost coolant and air may be reduced, and the cooling efficiency increases because the noise generation restraining portion maximizes the cooling effect.

5 Claims, 10 Drawing Sheets

COUNTER FLOW TYPE OF COOLING TOWER

FIELD OF THE INVENTION AND DESCRIPTION OF RELATED ART

This invention relates to a counter flow type of cooling tower, and particularly to a counter flow type of cooling tower generating low grade of noise, which allows the coolant flowing down from a filler to flow down by a first inclination plate and a support member of a noise generation restraining portion and come into a collection tank, thereby preventing the generation of noise caused when the coolant drops, preventing the coolant from scattering while dropping, and reducing the amount of the coolant that is included in external air and escapes to the exterior; and which is easy to produce and can minimize the decline in pressure caused by the noise generation restraining portion.

Generally, a cooling tower is an apparatus for lowering the temperature of heated coolant, which was used for an indoor unit of a centralized air conditioning system, i.e., an indoor air conditioner. It is divided into two types: an open type that lowers the temperature of coolant by thermal transmission occurring when the coolant contacts external air; and a closed type that lowers the temperature of coolant using the latent heat of vaporization of evaporation water, which is sprinkled on the coolant on a closed circuit.

The open type of cooling tower is subdivided into a counter flow type of cooling tower, a cross flow type of cooling tower, a non-power cooling tower, and so on. In particular, the counter flow type of cooling tower uses the principle for cooling coolant by thermal transmission occurring at the time the external air at a relatively low temperature contacts the coolant at a relative high temperature, by countering the external air, which comes through an open inhalation hole in the bottom of the side wall and passes a filler upward, and the coolant, which is sprayed from a spraying nozzle located above the filler and drops through the filler because of gravity.

In the counter flow type of cooling tower, when air moves in the vertical and upward direction and coolant moves in the vertical and downward direction, the contact of air and coolant results in exchange of heat. In the counter flow type of cooling tower, air moves almost in the horizontal direction and coolant moves in the vertical and downward direction.

Figure 1:
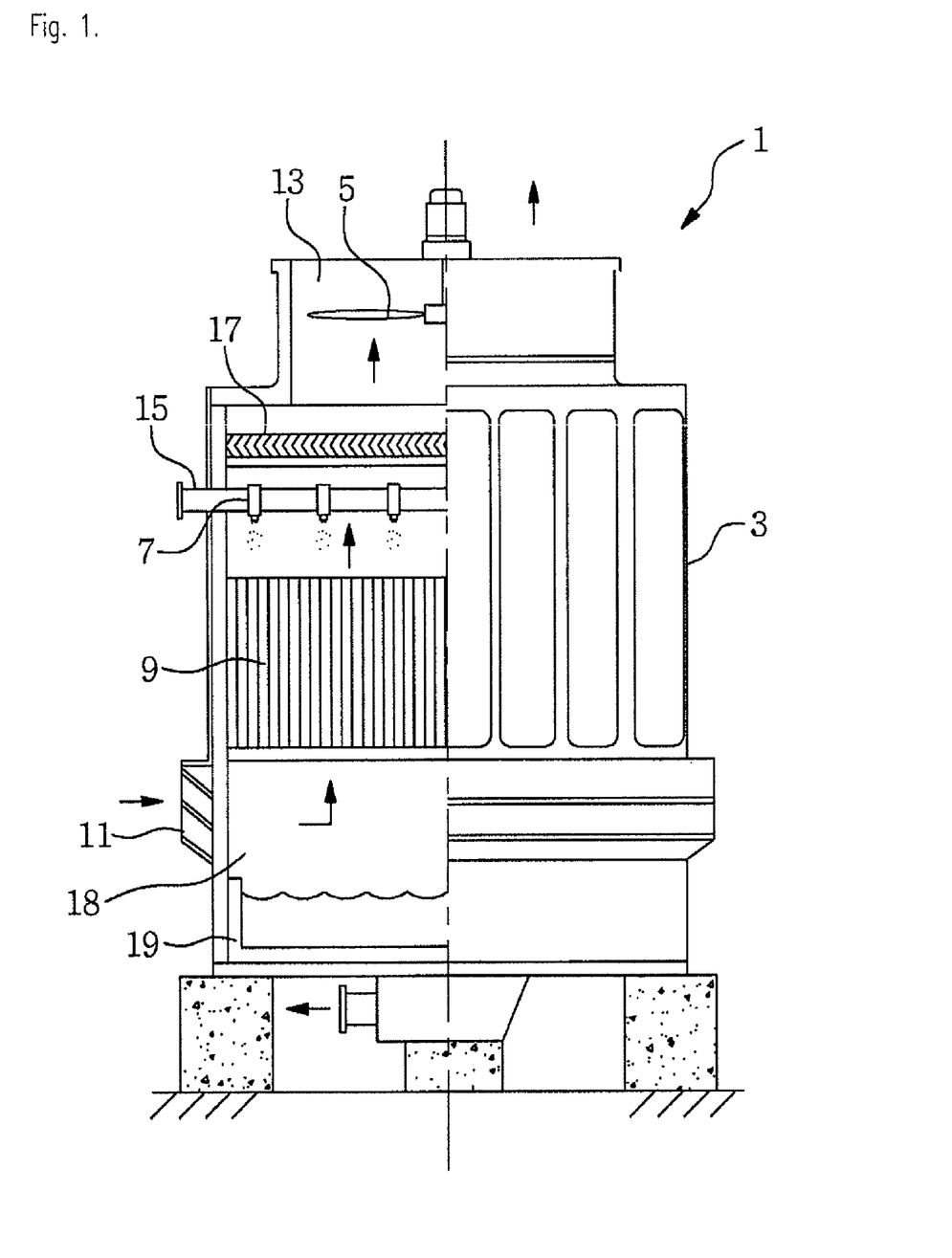
FIG. 1 is a half-sectional view of a prior general counter flow type of cooling tower.
Figure 2:
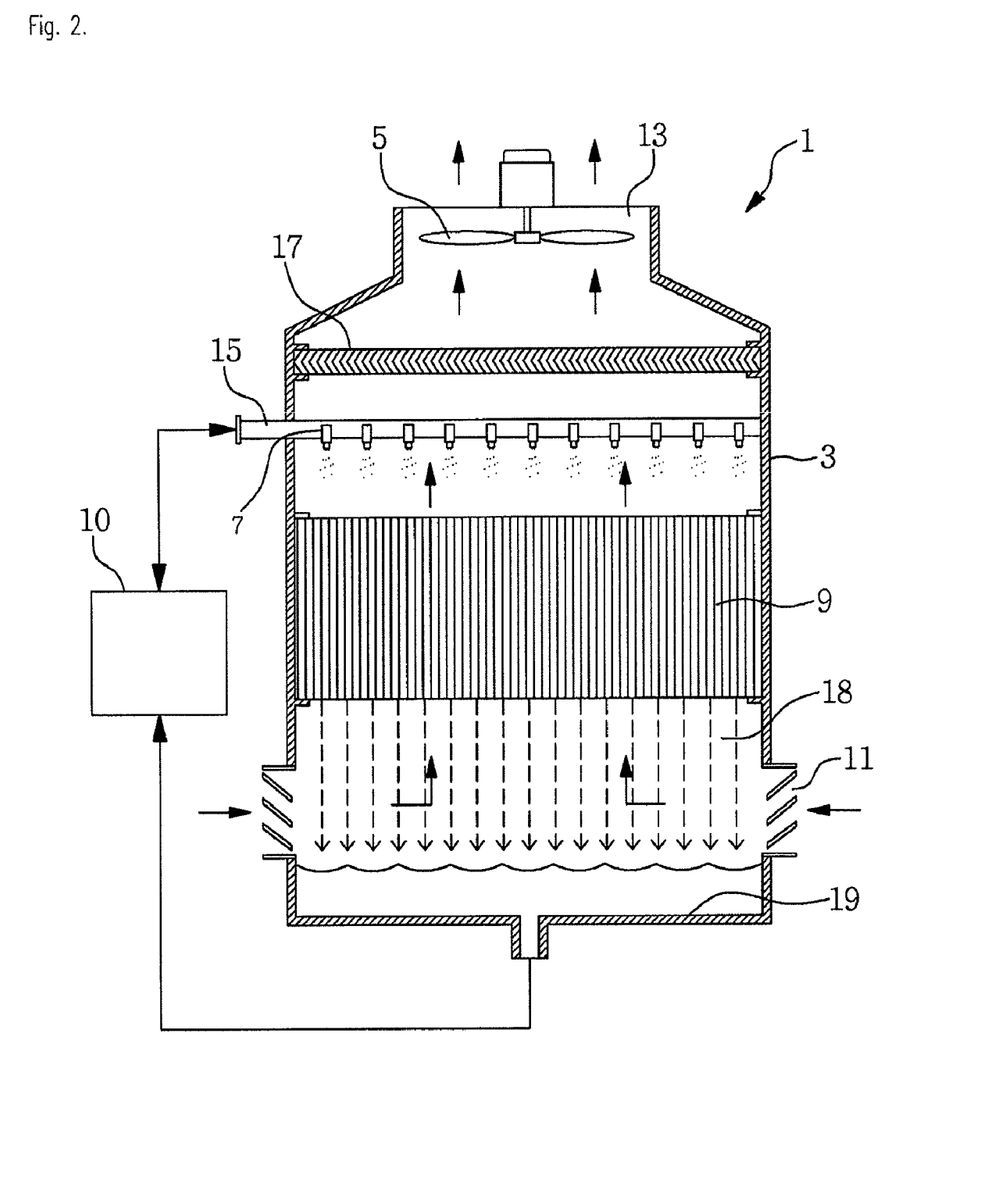
FIG. 2 is a schematic sectional view of the cooling tower shown by FIG. 1.

FIG. 1 is a half-sectional view of the counter flow type of cooling tower according to the prior art, and FIG. 2 is a sectional view of the counter flow type of cooling tower shown by FIG. 1. As illustrated in FIGS. 1 and 2, the counter flow type of cooling tower (1) according to the prior art comprises: an inhalation hole (11) formed on the side, through which eternal air comes; a body (3) wherein a discharge hole (13) discharging incoming air to the exterior is formed in the upper portion; a fan (5) that is installed on the upper portion of the body (3) and allows external air to come into the body (3) and be discharged to the exterior; a spraying nozzle (7) that sprays the coolant circulating from an air conditioning system (not illustrated in the figures) to a spraying tube (15); a filler (9) that is installed below the spraying nozzle (7) and absorbs the sprayed coolant; and a collection tank (19) that stores the water drops passing the filler (9) and dropping, wherein an eliminator (17) preventing coolant from scattering because of the discharged external air is installed above the spraying nozzle (7).

The body (3) is a cylindrical or rectangular case wherein an inhalation hole (11) inhaling external air is formed in the bottom of the side of the case and an external air discharge hole (13) discharging the inhaled external air is formed in the upper portion of the case.

The fan (5), which is installed in the discharge hole (13) of the top of the body (3); absorbs external air in the arrow direction and discharges the absorbed air to the exterior through the discharge hole (13). A plurality of spraying nozzles (7), which are installed in the spraying tube (15) located between the filler (9) and the eliminator (17), are configured to spray the coolant that comes from the indoor air conditioner (10) of a centralized air conditioning system through the spraying tube (15) over the filler (9). The eliminator (17) is a type of mesh filter, and captures and filters dust or large foams removed from the filler. The filler (9) located between the spraying nozzle (7) and the external air inhalation hole (11) scatters the coolant sprayed from the spraying nozzle (7) to prevent it from dropping, or allows a wide water membrane to be formed upon contact with a vertical film surface, thereby maximizing the contact surface with external air and allowing the coolant at high temperature to easily discharge heat.

If the fan (5) operates, external air comes through the inhalation hole (11), rises, passes the filler (9), and is discharged to the exterior through the discharge hole (13). Additionally, the coolant at high temperature comes through the spraying tube (15), is sprayed through at least one spraying nozzle (7) comprised in the spraying tube (15), is cooled upon contact with air, passes the filler (9), drops, and is collected into the collection tank (119).

In the counter flow type of cooling tower, the moving direction of air is opposite to the moving direction of coolant and when they contact with each other, heat is exchanged and the coolant is cooled. A space portion (18) is provided between the collection tank (19) and the filler (9) so that air is absorbed smoothly and passes the filler. In other words, the filler (9) is spaced from the collection tank (19) and installed above the collection tank (19).

Since the filler (9) is spaced from and installed above the collection tank (19), the prior counter flow type of cooling tower (1) had a problem that while the coolant drops through the space portion (18), it directly contacts air and is scattered with air to the exterior and in particular, that water drops of the coolant passing through the space portion (18) increase noise and the cooling effect is not great because the coolant is cooled only by the filler (9).

SUMMARY OF INVENTION

This invention is provided to resolve the problems of the prior counter flow type of cooling tower. Specifically, a noise generation restraining portion is provided between the filler and the collection tank, thereby allowing the coolant passing the filler to flow along the noise generation restraining portion and preventing the coolant from dropping. Thus, the noise caused when the coolant drops can be fundamentally shut out, the coolant can be prevented from being scattered to the exterior while dropping, air resistance caused by the noise generation restraining portion can be minimized, and the cooling effect can be enhanced because the noise generation restraining portion first cools the coolant.

In order to achieve this objective, the counter flow type of cooling tower generating low grade of noise according to this invention comprises: a body wherein an external air inhalation hole is formed in the lower portion and a discharge hole is formed in the upper portion; a fan that is provided in the body and absorbs external air into the body through an inhalation hole and discharges the external air to the discharge hole; a spraying nozzle that sprays coolant; an eliminator that is provided above the spraying nozzle and prevents air and water from scattering; a filler that is provided below the spraying nozzle; and a collection tank collecting the coolant that passes the filler and drops, wherein a space portion is formed between the filler and the collection tank, and the space portion formed between the filler and the collection tank further comprises a noise generation restraining portion consisting of at least one noise generation restraining unit.

The noise generation restraining unit comprises: an inclination portion consisting of a first inclination member that is tilted in one side relative to the dropping direction of the coolant that passes the filler and drops, and a second inclination member that is connected with the first inclination member and is tilted in opposite direction of the first inclination member such that the first inclination member and the second inclination member form a concave portion; at least one through-hole that is formed in the inclination portion; and at least one support member that is connected with the inclination portion, extends below the through-hole, and guides the coolant dropping through the through-hole.

An absorption member is deposited on the first inclination member.

The noise generation restraining portion comprises a plurality of noise generation restraining units, wherein the inclination portions of the plurality of noise generation restraining units are installed to overlap with respect to the dropping direction of the coolant.

The noise generation restraining portion is characterized in that a pipe member is provided in the side direction of the support member and a portion of the through-hole is connected to the pipe member.

The counter flow type of cooling tower generating low grade of noise further comprises: a plurality of secondary spraying nozzles that are located above the spraying nozzle and spray low temperature water over the filler; a storing tank that is connected with the secondary spraying nozzle via a low temperature water supplying tube and accommodates low temperature water; a pump that is installed on the low temperature water supplying tube and sprays water stored in the storing tank to the secondary spraying nozzle; a retrieving plate portion consisting of at least one retrieving plate that is mounted between the spraying nozzle and the secondary spraying nozzle such that the low temperature water sprayed from the secondary spraying nozzle and the water condensed from external air by the low temperature water are retrieved to the storing tank; and a retrieving tube that connects the storing tank and the retrieving plate.

The retrieving plate is formed in a dual layer, wherein multiple ventholes cross one another and penetrate so that the external air can pass therethrough. A gutter, which collects the low temperature water and condensed water flowing from the retrieving plate, is installed in the bottom layer of the retrieving plate.

The counter flow type of cooling tower generating low grade of noise according to this invention further comprises: a distribution portion that is spaced from and installed above the secondary spraying nozzle within the body; a secondary moisture removing portion that is installed above the eliminator; and an external air incoming portion consisting of an external air incoming tube, which is connected with the side of the body between the secondary spraying nozzle and the distribution portion and draws a secondary external air, and a blower fan. Thus, it is possible to prevent moisture included in the eternal air from being discharged.

DESCRIPTION OF THE PREFERRED EMBODIMENTS

Preferred embodiments of the counter flow type of cooling tower generating low grade of noise according to this invention are set forth below with reference to the accompanying drawings. The constitutions in this invention that correspond to the constitutions in the prior art use the same names and an explanation thereof are omitted.

Figure 3:
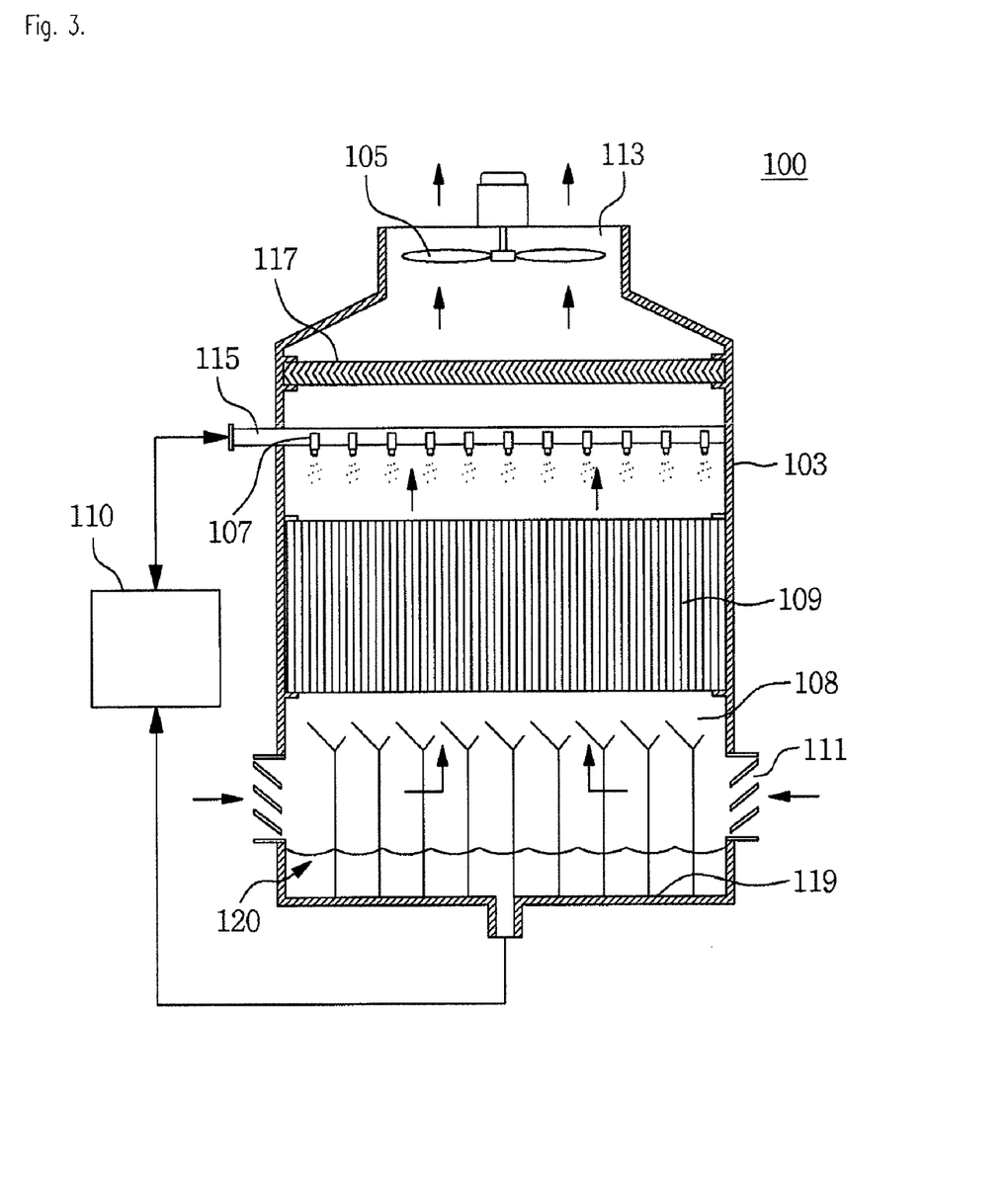
FIG. 3 is a schematic sectional view of the counter flow type of cooling tower generating low grade of noise according to a preferred embodiment of the invention.
Figure 4:
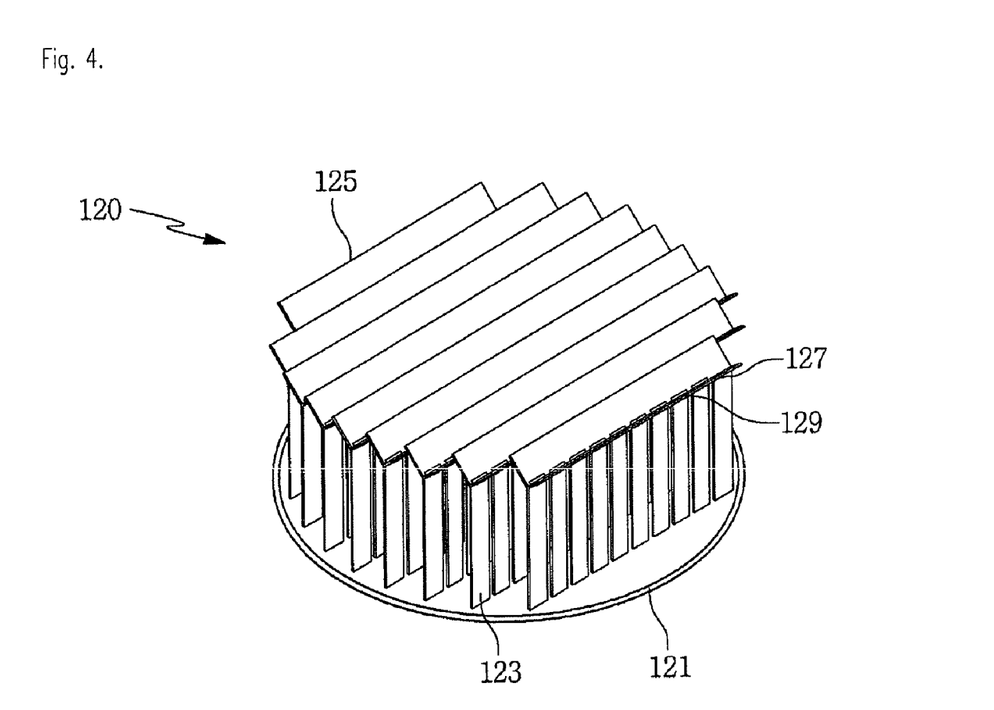
FIG. 4 is a schematic perspective view of the noise generation restraining portion comprised in the counter flow type of cooling tower generating low grade of noise according to a preferred embodiment of the invention
Figure 5:
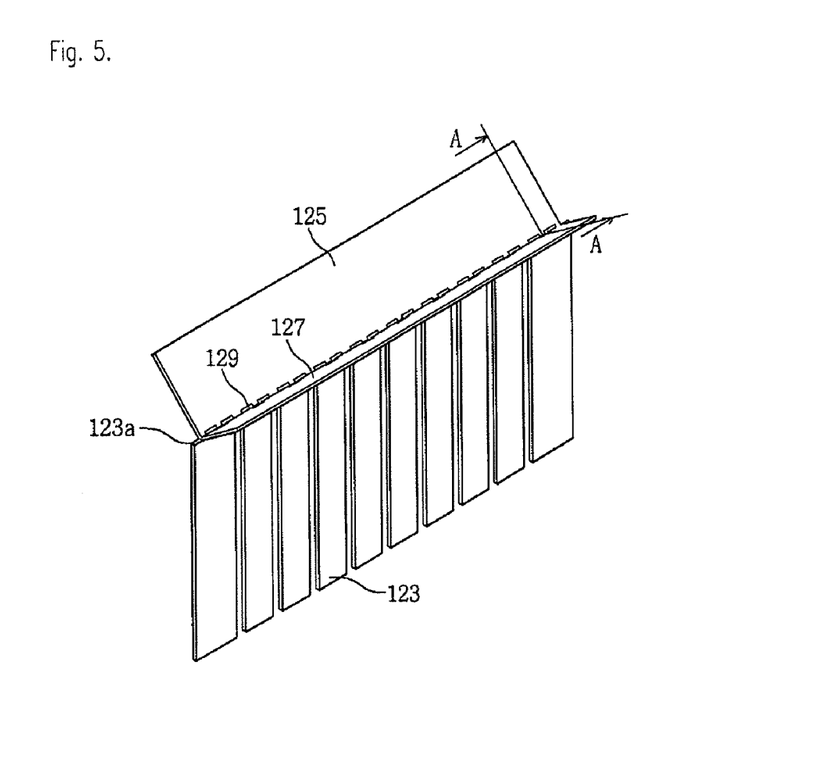
FIG. 5 is a schematic perspective view of the noise generation restraining unit constituting the noise generation restraining portion illustrated in FIG. 4.
Figure 6:
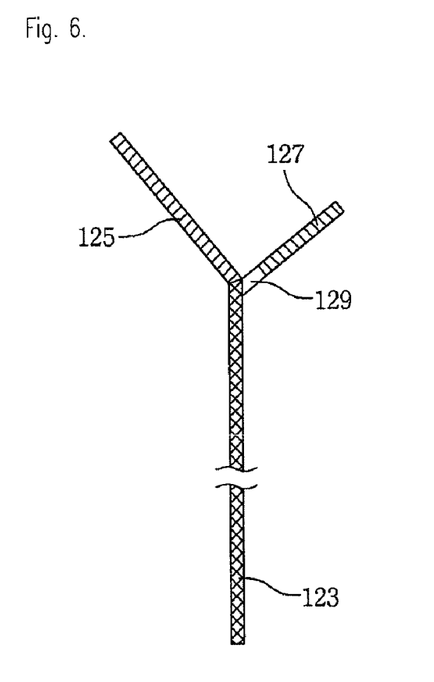
FIG. 6 is a partial sectional view taken along the line A-A of FIG. 5.
Figure 7:
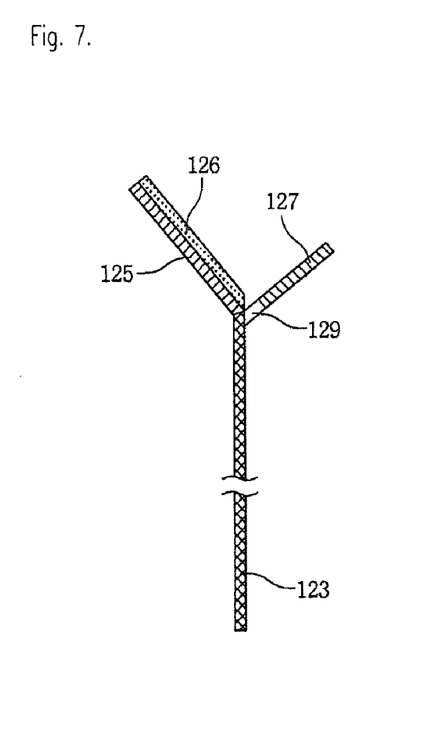
FIG. 7 is a partial sectional view taken along the line A-A of FIG. 5 and illustrating an alternative embodiment of the noise generation restraining unit constituting the noise generation restraining portion.
Figure 8:
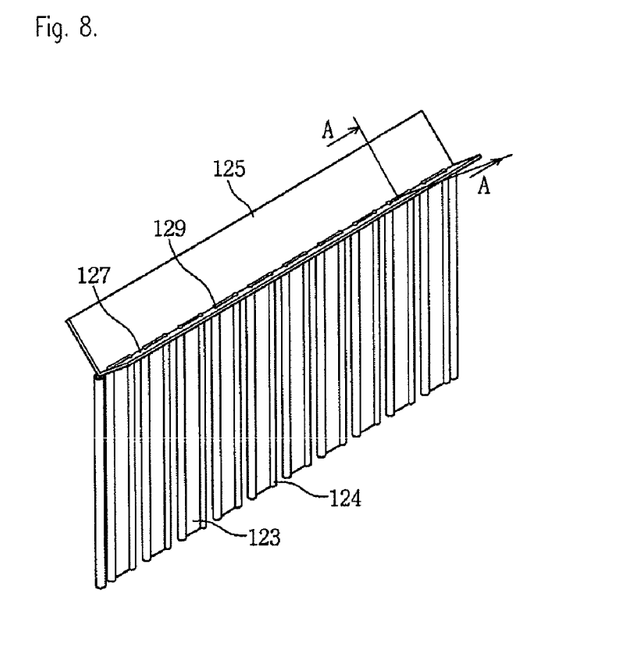
FIG. 8 is a perspective view of a further alternative embodiment of the noise generation restraining unit constituting the noise generation restraining portion.
Figure 9:
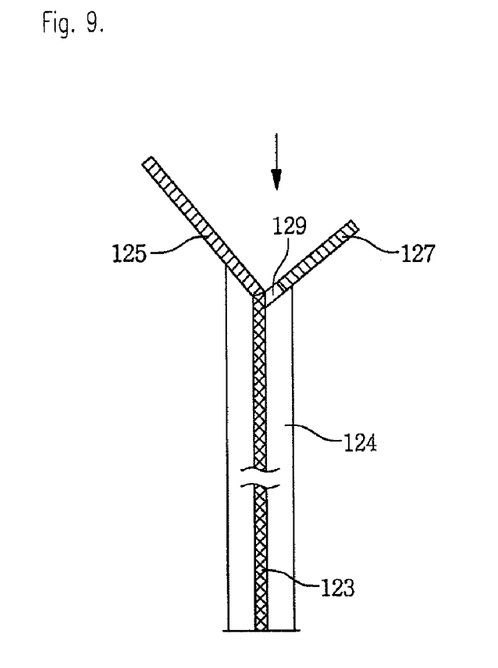
FIG. 9 is a sectional view taken along the line A-A of FIG. 8.
Figure 10:
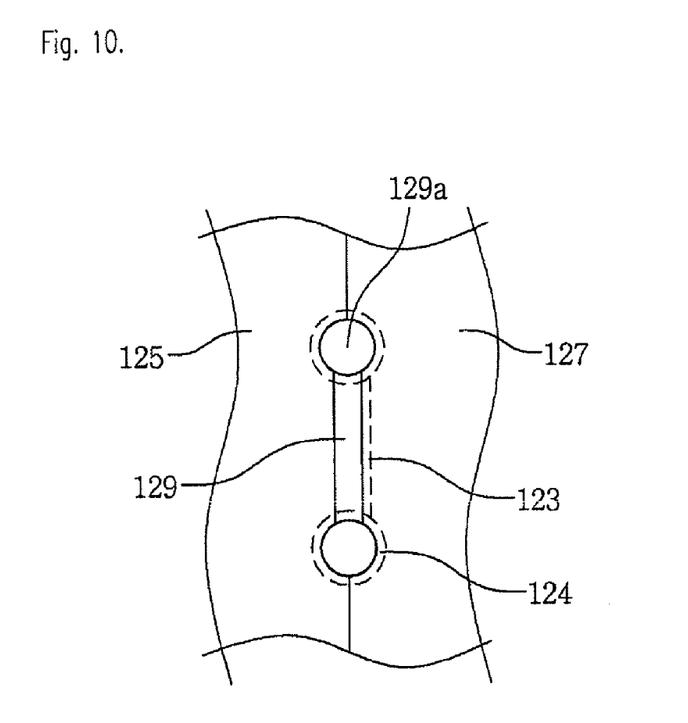
FIG. 10 is a partial sectional view shown in the arrow direction of FIG. 9.
Figure 11:
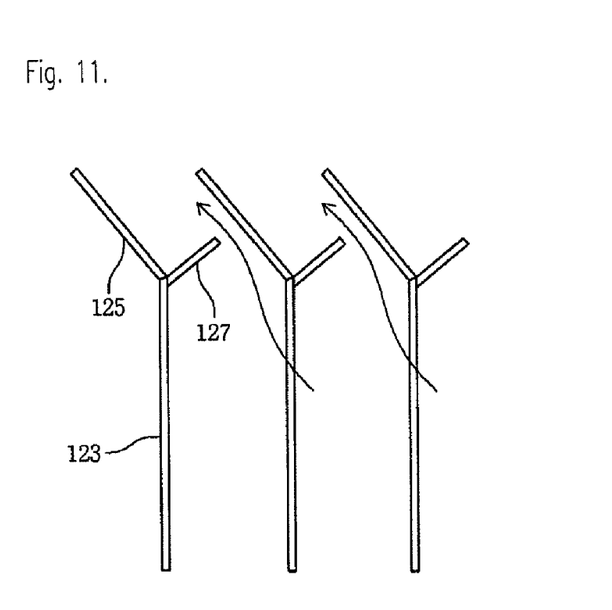
FIG. 11 is a side view of a portion of the noise generation restraining portion illustrated in FIG. 4.
Figure 12:
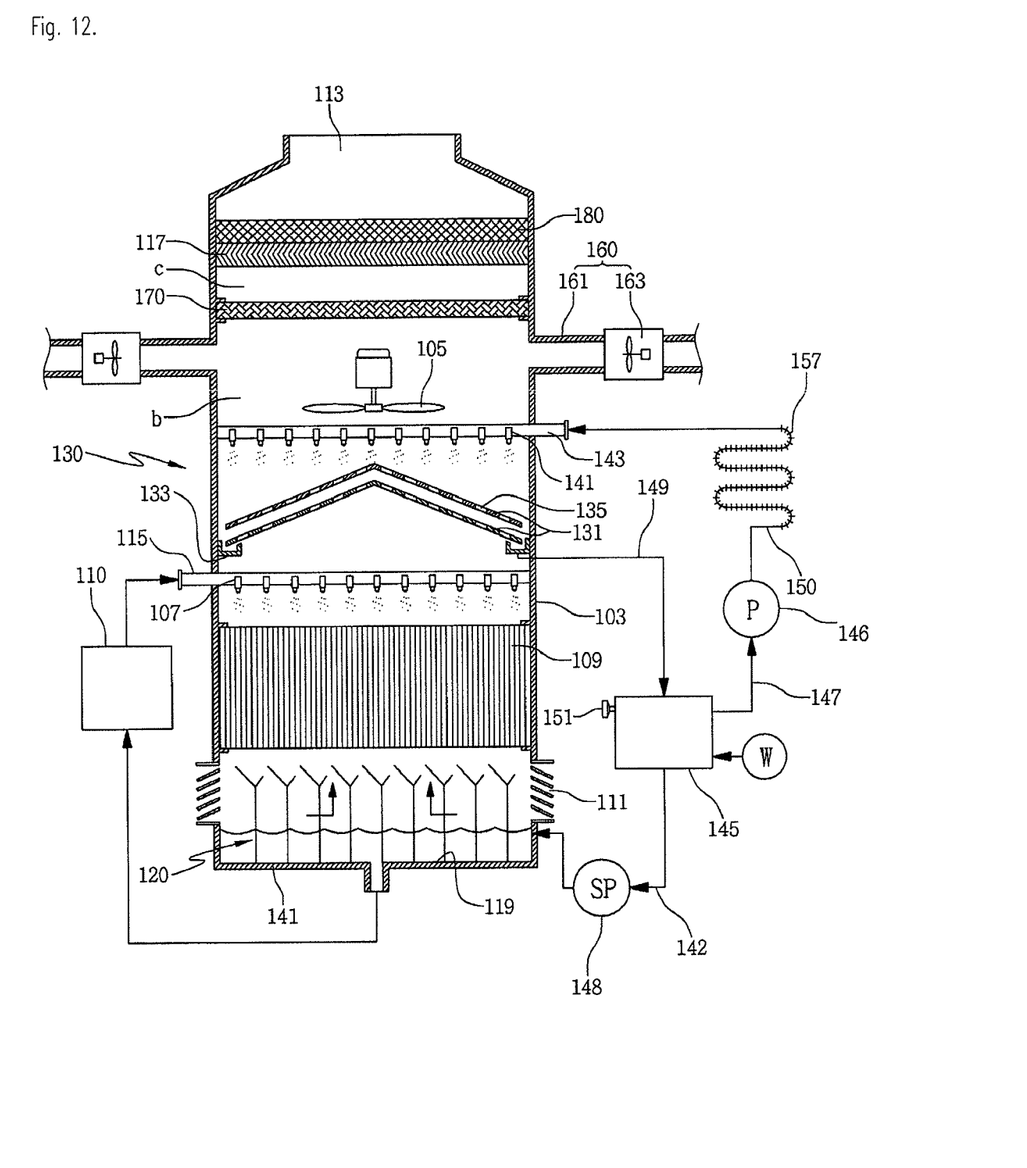
FIG. 12 is a schematic front view of an alternative embodiment of the counter flow type of cooling tower generating low grade of noise according to the invention.
Figure 13:
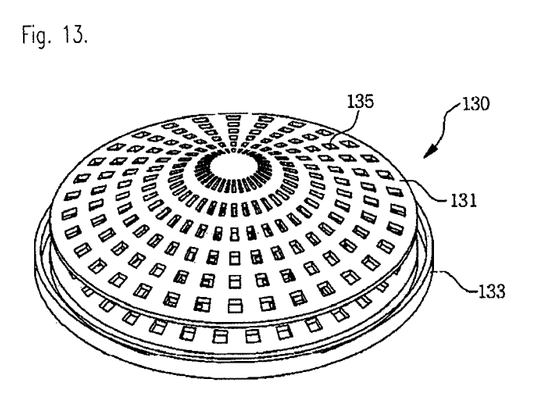
FIG. 13 is a perspective view of the retrieving plate illustrated in FIG. 12.
Figure 14:
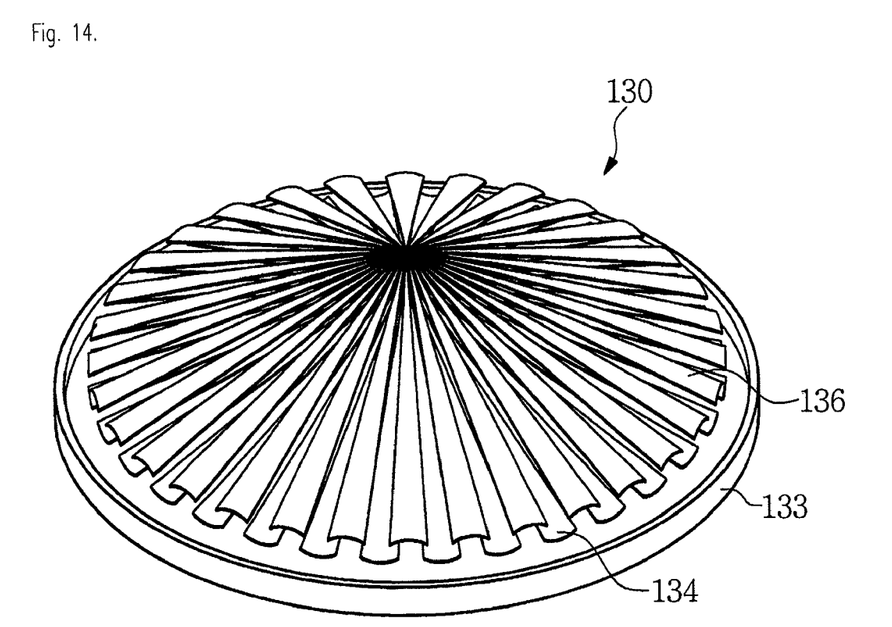
FIG. 14 is a perspective view of another form of the retrieving plate.
Figure 15:
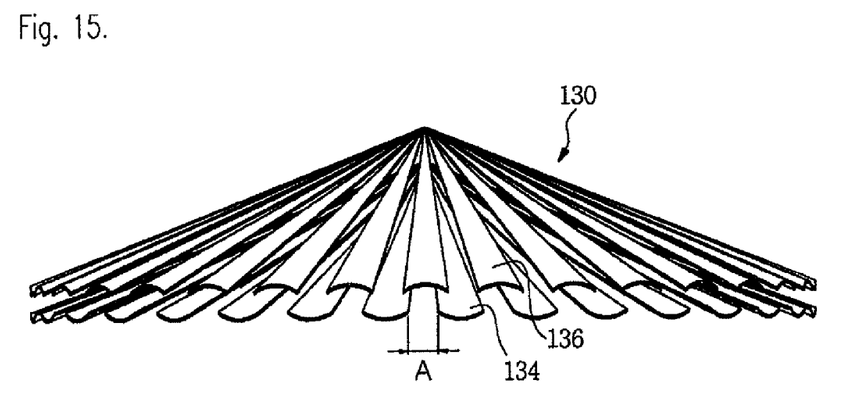
FIG. 15 is a perspective view of the retrieving plate of FIG. 6.
Figure 16:
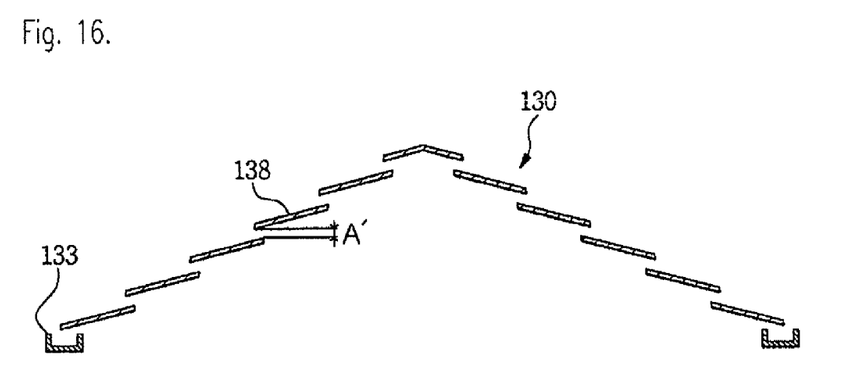
FIG. 16 is a schematic longitudinal view of the third form of the retrieving plate.

FIG. 3 is a schematic sectional view of the counter flow type of cooling tower generating low grade of noise according to a preferred embodiment of the invention. FIG. 4 is a schematic perspective view of the noise generation restraining portion comprised in the counter flow type of cooling tower generating low grade of noise according to a first preferred embodiment of the invention. FIG. 5 is a schematic perspective view of the noise generation restraining unit constituting the noise generation restraining portion illustrated in FIG. 4. FIG. 6 is a sectional view taken along the line A-A of FIG. 5. FIG. 7 is a sectional view taken along the line A-A of FIG. 5 and illustrating an alternative embodiment of the noise generation restraining unit constituting the noise generation restraining portion. FIG. 8 is a schematic perspective view of a further alternative embodiment of the noise generation restraining unit constituting the noise generation restraining portion. FIG. 9 is a sectional view taken along the line A-A of FIG. 8. FIG. 10 is a partial sectional view shown in the arrow direction of FIG. 9. FIG. 11 is a side view of some portions of the noise generation restraining portion illustrated in FIG. 4. FIG. 12 is a schematic front view of an alternative embodiment of the counter flow type of cooling tower generating low grade of noise according to the invention. FIG. 13 is a perspective view of the retrieving plate illustrated in FIG. 12. FIG. 14 is a perspective view of another form of the retrieving plate. FIG. 15 is a perspective view of the retrieving plate of FIG. 6. FIG. 16 is a schematic longitudinal view of the third form of the retrieving plate.

The counter flow type of cooling tower generating low grade of noise according to the invention, as illustrated in FIG. 3, comprises: a body (103) wherein an inhalation hole (111) is formed in the lower portion and a discharge hole (113) is formed in the upper portion; a fan (105) that is provided in the body (103) and operates to allow external air to come through the inhalation hole (111) and be discharged to the exterior through the discharge hole (113); at least one spraying nozzle (107) that is provided in the body (103) and sprays the coolant flowing through a distribution tube (115); a filler (109) that is provided below the spraying nozzle (107); an eliminator (117) that is provided above the spraying nozzle (107) and prevents air and water from scattering; and a collection tank (119) collecting the coolant that passes the filler (109) and drops, wherein a space portion (108) is formed between the filler (109) and the collection tank (119). Thus, the filler (109) is spaced from the collection tank (119) and provided above the collection tank (119).

Drawing reference numeral "110" in FIG. 3 illustrates an indoor air conditioner of a centralized air conditioning system.

In the space portion (108) formed between the collection tank (119) and the filler (109), a noise generation restraining portion (120) is installed to prevent (restrain) the noise generation by the coolant that passes the filler (109) and drops. The noise generation restraining portion (120) prevents the coolant that passes the filler (109) and drops from directly falling into the collection tank (119), thereby preventing the noise generation caused when the coolant directly drops and the coolant from scattering.

The noise generation restraining portion (120) includes at least one noise generation restraining unit, which comprises: an inclination portion consisting of a first inclination member (125) that is tilted in one side relative to the dropping direction of the coolant that passes the filler (109) and drops, and a second inclination member (127) that is connected to the first inclination member (125) and is tilted in opposite direction of the first inclination member (125) so that the first inclination member (125) and the second inclination member (127) form a concave portion; at least one through-hole (129) that is formed in the inclination portion; and at least one support member (123) that is connected with the inclination portion, extends below the through-hole (129), and guides the coolant dropping through the through-hole (129). The support member (123), as illustrated in FIGS. 4 to 6, may be formed of a board, or may be configured to have a concavo-convex surface or a bent section so as to broaden the surface area and increase the amount of the coolant flowing along the surface of the support member (123).

The first inclination member (125) and the second inclination member (127) are installed to form a V shape so that they are tilted in opposite direction from each other. As illustrated in FIG. 5, it is desirable to form the width of the first inclination member (125) larger than the width of the second inclination member (127). By forming the width of the first inclination member (125) larger than the width of the second inclination member (127), the neighboring noise generation restraining units do not contact with each other and the inclination portions may be configured to overlap with respect to the dropping direction of the coolant, as illustrated in FIGS. 4 and 11. The overlapping inclination portions allow the coolant not to fall directly into the collection tank (119).

Although FIG. 6 show that the first inclination member (125) and the second inclination member (127) have a straight inclination, these inclination members may be configured to have a concave inclination.

Regarding the installation of a plurality of noise generation restraining units constituting the noise generation restraining portion (120), the first inclination member (125) of a noise generation restraining unit is installed to overlap with the first inclination member (125) of a neighboring noise generation restraining unit, as illustrated in FIG. 11. The end of the second inclination member (127), which is tilted in the opposition direction to the first inclination member (125), is spaced from the first inclination member (125) of the neighboring noise generation restraining unit not to contact with each other. Thus, as illustrated in FIG. 11, a passage that air can flow is formed between the second inclination member (127) of a noise generation restraining unit and the second inclination member (127) of the neighboring noise generation restraining unit.

By installing the second inclination member (127) of a noise generation restraining unit to overlap with the first inclination member (128) of the neighboring noise generation restraining unit, the coolant that passes the filler (109) drops on the first inclination member (125) and flows along the tilted first inclination member (125).

The inclination portion comprising the first inclination member (125) and the second inclination member (127) includes at least one through-hole (129) formed along the longitudinal direction of the inclination portion (the vertical direction to the ground surface, as shown in FIG. 6), as illustrated in FIGS. 4 to 6. It is desirable to form the through-hole (129) in the concave portion at which the first inclination member (125) and the second inclination member (127) meet with each other. The support member (123) is installed below the through-hole (129) along the longitudinal direction of the inclination portion. Thus, if two or more through-holes (129) are formed, two or more support members (123) are provided and a distance, which allows air to flow, is formed between the support members (123).

The coolant flows downward along the first inclination member (125), reaches the concave portion, and passes the through-hole (129). Then, it drops along the surface of the support member (123) installed below the through-hole (129) and reaches the collection tank (119). Thus, the noise generated when the coolant directly drops into the collection tank (119) is restrained.

Since the coolant that drops on the first inclination member (125) may spring up, flow on the neighboring first inclination member (125), and directly drop into the collection tank (119), it is desirable to deposit an absorption member (126), such as sponge, on the first inclination member (125), as illustrated in FIG. 7. If the absorption member (126) is deposited, since the coolant that drops on the absorption member (126) is absorbed into the absorption member (126), passes the absorption member (126), and flows through the through-hole (129), it is possible to prevent the situation that the coolant springs up from the first inclination member (125), flows on the neighboring first inclination member (125), and directly drops into the collection tank (119). As described above, the absorption member (126) may be deposited on the first inclination member (125) or the first inclination member (125) may be made of an absorption material.

A protrusion portion (123a) may be formed in a pipe member, as illustrated in FIG. 8, and the pipe member may be formed in one side or both sides of the support member (123) installed below the through-hole (129). If the protrusion portion (123a) is formed in a pipe member, the coolant that flows on both ends of the inclination portion may flow along the inside diameter surface and the outside diameter surface of the pipe member. Thus, although a great amount of coolant flows on both ends of the inclination portion, the coolant does not directly drop and flows along the surface of the pipe member.

If the support member (123) comprises a pipe member (124) in one side or both sides, a portion of the through-hole (129) may be formed in a connection hole (129a) to be connected with the pipe member (124), as illustrated in FIGS. 9 and 10. The coolant that passes the connection hole (129a) flows along the inside diameter surface of the pipe member (124) to the collection tank (119). A slit (not illustrated in the drawings) may be formed between the pipe member (124) and the inclination portion, thereby allowing the coolant to flow through the slit along the outside diameter surface of the pipe member (124).

Since the coolant passes the through-hole (129) and flows along the inside diameter surface of the pipe member (124) to the collection tank (119), the pipe member (124) shuts out the noise generated by the coolant that flows inside and thus, the noise can be decreased.

Unexplained drawing reference numeral "121" in FIG. 4 illustrates a support panel for supporting the support members (123). The noise generation restraining unit may be installed by forming a groove (not illustrated in the drawings) in the support panel (121), into which the support member (123) is inserted, and fixing the support member (123) into the groove. Naturally, the support member (123) may be installed directly in the collection tank (119), may not form a groove and may be erect by including a heavy object in the upper portion of the support member (123), or may be installed by using welding or bolts and nuts.

Meanwhile, as illustrated in FIG. 12, the cooling tower (100) according to the invention may further comprise a secondary spraying tube (143) consisting of a plurality of secondary spraying nozzles (141), and the retrieving plate portion (130). The secondary spraying tube (143) is provided above the spraying tube (115) and the retrieving plate portion (130) is provided between the spraying tube (115) and the secondary spraying tube (143).

The secondary spraying tube (143) passes the filler (109) and sprays the low temperature water supplied from a storing tank (145) to the external air at high temperature and humidity. To do so, the secondary spraying tube (143) is connected with the storing tank (145) over a low temperature supplying tube (147) and the storing tank (145) is configured to temporarily store water at a relatively low temperature supplied from the collection tank (119), i.e., low temperature water. Then, a water source (W) is connected with the storing tank (145) and may supply water to the storing tank (145), if required. Further, a water supplying pump (146) is installed in the outlet side of the storing tank (145). A bent portion (150) such as a radiator of a motor vehicle may be installed on the low temperature supplying tube (147) between the water supplying pump (146) and the secondary spraying tube (143), and a plurality of radiation pins (157) may be attached thereto. Therefore, the low temperature supplying tube (147) can further lower the temperature of the low temperature water, which passes the bent portion (150) over the radiation pins (157), without adding further energy. "151" in FIG. 12 illustrates a sensor that measures the water level of the storing tank (145).

As described above, the low temperature water sprayed from the secondary spraying nozzle (141) and the water, which is condensed from the external air cooled by the low temperature water, pass the filler (119) along with the coolant sprayed from the spraying nozzle (107) and are collected to the collection tank (119). Thus, when the water level of the collection tank (119) is higher than an established value, the water in the collection tank (119) can be carried to the storing tank (145). To do so, the storing tank (145) is connected with the collection tank (119) over the retrieving tube (142) mounted with an auxiliary pump (148).

The retrieving plate portion (130), which comprises at least one retrieving plate (131) and is provided between the spraying tube (115) and the secondary spraying tube (145), retrieves the low temperature water. The retrieving plate (131) collects the low temperature water sprayed from the secondary spraying nozzle (141) and the water, which is condensed from the external air cooled by the low temperature water, and retrieves them to the storing tank (145). To do so, the retrieving plate (131) should be structured to allow the external air sucked up through the filler (109) to easily pass and the low temperature water sprayed from the spraying nozzle (141) and condensed water not to pass and be collected in one side, like a filter with large mesh or eliminator. If this function is met, the retrieving plate (131) may be produced in various shapes, e.g., a hollow conical shape, as illustrated in FIGS. 12 and 13.

As illustrated in FIGS. 12 and 13, the retrieving plate (131) has multiple ventholes (135), through which external air passes. It is desirable to locate two or more ventholes to cross one another so that the low temperature water or condensed water cannot pass through the ventholes (135). Further, as illustrated in the drawings, since the retrieving plate (131) is outwardly and downwardly tilted while adopting the center as an apex like a cone, the low temperature water and condensed water that are sprayed from the secondary spraying nozzle (141) and are adhered to the surface can flow outward. Also, a ring-shaped gutter (143) is provided around the retrieving plate (131) to temporarily collect and contain the flowing water and the gutter (133) is connected with the storing tank (145) over the retrieving plate (149).

The retrieving plate may be embodied in any forms only if it can allow external air to pass and can retrieve all of the low temperature water and condensed water sprayed from the secondary spraying nozzle (141). Thus, the retrieving plate as illustrated in FIGS. 14 and 15 may be applied as another embodiment. This retrieving plate has a conical shape that is outwardly and downwardly tilted while adopting the center as an apex, like the above-described retrieving plate, and is formed in narrow fan-shaped retrieving pieces (134, 136) that are arranged with a certain distance of ventilation gap (A) in the circumferential direction, wherein a gutter is mounted in the circumference thereof. Further, this retrieving plate is provided in two layers to prevent the low temperature water from leaking through the ventilation gap (A). The retrieving piece (136) in the top layer has a convex surface so that the dropping low temperature water and condensed water can easily slip in the right and left direction and drop on the retrieving piece (134) in the bottom layer, whereas the retrieving piece (134) in the bottom layer has a concave surface so that the adhered low temperature water or condensed water, and the low temperature water or condensed water dropping from the retrieving piece (136) in the top layer can flow to the gutter (133). Also, although not illustrated in the drawings, the retrieving piece (136) in the top layer may be formed to have a concave surface so that each of the retrieving pieces (136, 134) can flow the low temperature water or condensed water to the gutter (133).

A third embodiment of the retrieving plate portion (130) is illustrated in FIG. 16. The retrieving pieces (138) of this retrieving plate portion, which are formed up to the gutter (133), are arranged in a manner to pile up roof tiles so that external air can pass through a ring-shaped venthole (A') formed between the retrieving pieces (138) and the low temperature water dropping from the above retrieving piece (138) does not pass through the venthole (A'), drops on the bottom retrieving piece (138), and is collected to the gutter (133).

Since a great amount of vapor that was pre-cooled by the low temperature water sprayed from the secondary spraying nozzle is deprived in the form of condensed water and is sufficiently dried, the temperature difference from atmosphere upon discharge is not large and it is not so humid to generate foams due to the temperature difference, and thus, white lead is not generated. Therefore, direct damages, such as spreading of pollution materials caused by white lead, and indirect damages, such as disgust from the appearances, can be prevented.

As described above, the secondary spraying nozzle sprays low temperature water. Thus, since most of the vapor contained in the external air can be retrieved in the form of condensed water, it is possible to prevent coolant from flowing out along with external air and being lost rapidly, unlike the prior cooling tower. Therefore, the decline in performance of a centralized air conditioning system resulting from lack of coolant can be prevented and the cost incurred for supplementing coolant can be saved.

In FIG. 12, drawing reference numerals "160," "161," and "163" illustrate an external air incoming portion, an external air incoming tube, and a blower fan for drawing external air, respectively. As illustrated in FIG. 12, the cooling tower according to this invention further comprises a distribution portion (170) that is installed above the secondary spraying nozzle (141) in the body (103) to form a mixed space (b), and the eliminator (117) is spaced from and installed above the distribution portion (170) to form a buffer space (c). The cooling tower according to this invention further comprises a secondary moisture removing portion (180) that is installed above the eliminator (117). The external air incoming portion (160) is provided in the side surface of the body (103) and draws external air to the mixed space (b). If the cooling tower according to this invention further comprises the external air incoming portion(160) as illustrated in FIG. 12, the fan(105) is provided in the mixed space (b), under the inlet end of the external air incoming tube(161).

The external air, which passes the secondary spraying nozzle (141), is mixed with a secondary external air, which comes through the external air incoming portion (160), in the mixed space (b), and rises toward the distribution portion (170). The distribution portion (170) is made of a board or net material having multiple through-holes, and uniformly distributes the external air and the secondary external air so that they flow to the buffer space (c). The external air and the secondary external air that pass the distribution portion (170) are mixed again in the buffer space (c), keep rising, and are discharged to the exterior through the eliminator (117) and the secondary moisture removing portion (180). While the external air and the secondary external air pass the eliminator (117) and the secondary moisture removing portion (180), the moisture included in the external air is removed. Demister is used as the eliminator (117) and removes about 90% of the moisture included in the external air. A filter is used as the secondary moisture removing portion (180) provided to capture moisture, a white lead particle. It is desirable to filter white lead particles having the size in the range of 50 μm-100 μm.

The embodiments of this invention have been explained with reference to the drawings. However, the scope of protection sought in this invention is not limited to the aforementioned embodiments and should be acknowledged up to the scope that one of ordinary skill in the art can easily practice from the embodiments of this invention.

According to the counter flow type of cooling tower generating low grade of noise (100) claimed in this invention, as explained above, the coolant that flows downward from the filler (109) does not directly drop to the collection tank (119) and drops to the inclination portion of the noise generation restraining portion (120), more particularly, the first inclination member (125). The coolant flows along the surface of the first inclination member (125), passes through the throughhole (129) formed in the inclination portion, and flows along the surface of the support member (123) or the pipe member (124), thereby reducing the noise generated when the coolant directly drops to the collection tank (119). Since the coolant flows along the surface of the support member (123) or the pipe member (124), it is possible to prevent the coolant from scattering because of the incoming air. Since air may rise between the inclination members (125), the loss in pressure caused by the noise generation restraining portion (120) is minimized. The amount of coolant and air that are lost to the exterior can be reduced. Since the time that the coolant flowing along the surface of the support member (123) or the pipe member (124) contacts the external air is prolonged, the cooling effect in the noise generation restraining portion (120) is maximized and thus, the cooling efficiency is enhanced.

What is claimed is:

1. A counter flow type of cooling tower, comprising:
    a body wherein an external air inhalation hole is formed in the lower portion and a discharge hole is formed in the upper portion;
    a fan that is provided in the body and absorbs external air into the body through an inhalation hole and discharges the external air to the discharge hole;
    at least a spraying nozzle that is provided in the body and sprays coolant;
    an eliminator that is provided above the spraying nozzle and prevents air and water from scattering;
    a filler that is provided below the spraying nozzle;
    a collection tank collecting the coolant that passes the filler and drops;
    a plurality of secondary spraying nozzles that are located above the spraying nozzle and spray low temperature water over the filler; and
    a retrieving plate portion consisting of at least one retrieving plate that is mounted between the spraying nozzle and the secondary spraying nozzle.

2. The counter flow type of cooling tower according to claim 1, wherein the retrieving plate is formed in a dual layer, wherein multiple ventholes cross one another and penetrate, such that the external air can pass therethrough and a gutter that collects the low temperature water and condensed water falling along the retrieving plate is installed around the bottom layer of the retrieving plate.

3. The counter flow type of cooling tower according to claim 1, wherein the retrieving plate is formed in narrow fan-shaped retrieving pieces that are arranged with a certain distance of ventilation gap (A) in the circumferential direction, and a gutter is mounted in the circumference thereof.

4. The counter flow type of cooling tower according to claim 1, further comprising:
- a distribution portion that is spaced from and installed above the secondary spraying nozzle within the body forming a mixed space(b);
- a secondary moisture removing portion that is installed above the eliminator;
- an external air incoming portion consisting of an external air incoming tube that is connected to the side of the body between the secondary spraying nozzle and the distribution portion, and draws a secondary external air, and a blower fan; the fan is provided in the mixed space (b), under the inlet end of the external air incoming tube.

5. The counter flow type of cooling tower according to claim 1, further comprising:
- a storing tank that is connected with the secondary spraying nozzle via a low temperature water supplying tube and accommodates low temperature water;
- a pump that is installed on the low temperature water supplying tube and sprays water stored in the storing tank with the secondary spraying nozzle; and a retrieving tube that connects the storing tank and the retrieving plate.

* * * * *